Sept. 18, 1962 — G. E. KELLOGG — 3,054,387
HYDRAULIC BOOSTER UNIT
Filed Sept. 21, 1959 — 2 Sheets-Sheet 1

INVENTOR.
George E. Kellogg
BY
His Attorney

Sept. 18, 1962 G. E. KELLOGG 3,054,387
HYDRAULIC BOOSTER UNIT

Filed Sept. 21, 1959 2 Sheets-Sheet 2

INVENTOR.
George E. Kellogg
BY
His Attorney

United States Patent Office 3,054,387
Patented Sept. 18, 1962

3,054,387
HYDRAULIC BOOSTER UNIT
George E. Kellogg, Miamisburg, Ohio, assignor to General Motors Corporation, Detroit, Mich., a corporation of Delaware
Filed Sept. 21, 1959, Ser. No. 841,202
3 Claims. (Cl. 121—41)

This invention relates to a hydraulic brake booster and more particularly to an improved valve and means for actuating the valve in a hydraulic booster unit.

A hydraulic brake booster unit may be readily adapted for use in a motor vehicle having a source of pressurized hydraulic fluid. A disadvantage of using a hydraulic booster, however, is in the fact that a valve arrangement having a positive fluid seal is difficult to provide due to the fact that the fluid pressure is relatively high in order to keep the size of the booster small. Accordingly, this invention is intended to provide the proper valve arrangement providing a positive seal as well as a desirable "feel" to the operator of the vehicle brakes.

It is an object of this invention to provide a valve arrangement within the hydraulic brake booster which may be easily operated and yet provide a positive seal.

It is another object of this invention to provide in a hydraulic brake booster unit an annular valve seat of larger diameter for engaging a valve element having a smaller diameter extending through the valve seat with a gradually increasing diameter on said valve element to provide engagement with the annular valve seat.

It is a further object of this invention to provide a reaction means through a resilient diaphragm structure in the power chamber for transmitting a reaction "feel" to a nonresilient member which is manually controlled.

The objects of this invention are accomplished by providing a source of pressurized fluid for a hydraulic brake booster unit. A brake booster including a power cylinder with a power piston operates within the cylinder to form a power chamber. Passage means are formed within the cylinder and the power piston between the source of pressurized fluid and the power chamber. A valve means employing spherical valve elements operating against annular seats is located in the piston. The inlet valve is normally in a closed position and the outlet valve is normally in an open position to place the power unit in a normally nonoperating position. The reaction structure includes a resilient diaphragm within the power chamber operating against a manually controlled member to provide a proportionate field of the pressurized fluid within the power chamber and transmitting this force to a manually controlled member.

Figure 1:
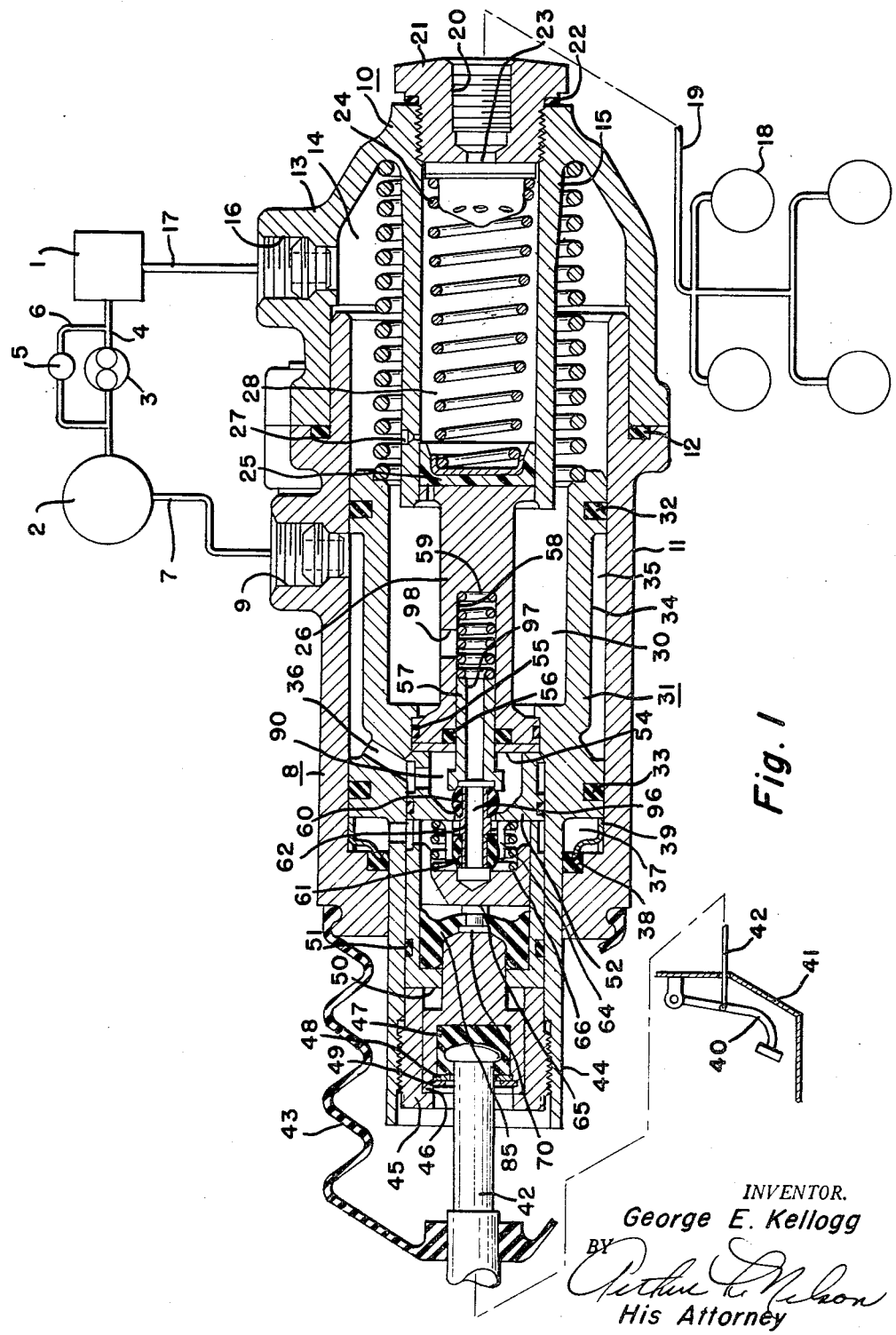
FIGURE 1 illustrates a cross-section view of a power booster unit and the manual means for controlling the unit.

In FIG. 1 the hydraulic power booster unit is illustrated in cross-section. The booster unit operates a master piston within a master cylinder which is adapted for pressurizing fluid for the operation of the vehicle brakes. The hydraulic booster unit is manually controlled as indicated by the manual control lever. A source of pressurized fluid is also illustrated for providing the power for operation of the booster unit.

The source of pressurized fluid includes a reservoir 1 for receiving the hydraulic fluid from the hydraulic booster unit. The reservoir is connected by a conduit 4 to an accumulator 2. A hydraulic pump 3 is placed within the conduit 4 connecting the reservoir 1 to the accumulator 2. A bypass valve 5 is placed in a conduit 6 which shunts the fluid pump 3. A conduit means 7 connects the accumulator 2 with the hydraulic booster unit 8 through the inlet port 9.

The hydraulic master cylinder 15 is formed in master cylinder casting 10. The casting 10 is connected to the power cylinder 11 and sealed in this connection by a seal 12. The radially outer portion 13 of the master cylinder casting 10 forms a passage chamber 14 between the radially outer portion 13 and the master cylinder 15 of the master cylinder casting 10. The outer portion 13 is provided with an outlet port 16 in communication with the conduit 17 which is connected to the reservoir 1.

A plurality of brakes 18 are connected by a conduit means 19 to the port 20. The port 20 is formed within the fitting 21 which threadedly engages the forward end of the master cylinder 10. A seal 22 is placed between the fitting 21 and the master cylinder 10. A valve assembly 23 is mounted within the master cylinder for maintaining a residual pressure within the brake actuating fluid system. The valve assembly 23 is held in position by the spring 24 operating against the seal 25.

The seal 25 is mounted on the forward end of the master piston 26. A vent 27 places the chamber 14 external of the master cylinder 15 in communication with the pressurizing chamber 28 within the master cylinder 15. In this manner the pressurized fluid system for operating the hydraulic booster unit is also in communication with the fluid system for actuating the fluid brakes.

The power cylinder 11 is fitted to the external portion 13 of the master cylinder casting 10. The forward end of the power cylinder 11 and the external portion 13 of the master cylinder casting 10 form the chamber 14 providing a reservoir for the master cylinder. Chamber 14 also is in communication with the annular passage 30 to provide passage means for the exhaust fluid from the hydraulic booster unit.

A power piston 31 operates within the power cylinder 11 and is provided with a forward seal 32 and an intermediate seal 33. The master piston is formed with an annular depression 34 forming the annular chamber 35. The chamber 35 forms the inlet passage means between the power cylinder 11 and the power piston 31. The chamber 35 extends about the outer periphery for the greater portion of the power piston 31 to provide communication between the inlet port 9 in the power cylinder 11 and the inlet passage 36 within the power piston 31.

The rearward end of the power piston 31 forms a power chamber 37 with the power cylinder 11. The bore diameter of the rearward end of the power cylinder 11 is reduced to fit the corresponding reduction in diameter of the power piston 31. The rear end of the master cylinder 11 and the master piston 31 are fitted with a seal 38 which is maintained in its position by a retainer ring 39.

The hydraulic booster unit is operated manually by a brake lever 40 which is pivotally mounted on the fire wall 41. A push rod 42 pivotally connects the brake lever 40 and extends centrally into the rearward end of the booster unit 8. A rubber boot 43 fits the outer periphery of the push rod 42 and the rearward end of the power cylinder 11 to provide a sealing means for foreign material between these two relatively moving parts. The rearward end 44 of the power piston 31 is formed of a reduced diameter and extends axially from the power piston 11. The intermediate portion of the power piston 31 has a cylindrical opening extending forwardly from the rear end. A guide 45 threadedly engages the rearward end and inner periphery of the power piston 31. The guide 45 also provides a stop for the rearward end of the actuating block 46. The actuating block 46 receives a rubber button 47 to provide a resilient seat for the forward end of the push rod 42. The button 47 is held in position by a retainer ring 48 and a snap ring 49 within the inner periphery of the actuating block 46.

The actuating block 46 is permitted to move forwardly a limited amount under the pressure of the push rod 42 to the point where it engages the rearward surface of the diaphragm seat 50.

The cylindrical opening extending forwardly in the rear end of the power piston 31 also provides a guide means for the diaphragm seat 50. A seal 51 is mounted in an annular recess on the outer periphery of the diaphragm seat 50 and engages the inner periphery of the cylindrical opening in the rearward end of the power piston 31. The diaphragm seat 50 extends forwardly within the cylindrical opening of the power piston 31 to engage the rearward wall of the inlet valve seat 52. The inlet valve seat 52 is also mounted concentrically within the cylindrical opening in the power piston 31.

The master piston 26 is mounted with the forward end operating axially within the master cylinder 15. The rearward end of the master piston 26 extends rearwardly into a concentric opening of the power piston 31. The rearward radial wall of the master piston 26 engages a pressure plate 54 which also contacts the forward wall of the inlet valve seat 52. A seal 55 is mounted about the outer periphery of the rearward end of the master piston 26 and engages the inner periphery of the power piston 31. A second seal 56 is also placed about the inner periphery of the master piston 26 on its rearward end and engages the inlet valve element guide 57. The inlet valve element guide 57 is concentrically mounted within the rearward end of the master piston 26. The inlet valve element guide 57 extends forwardly within a cylindrical opening 58 in the rearward end of the master piston 26 and operates against a spring 59.

The inlet valve element 60 and the outlet valve element 61 are concentrically mounted on a sleeve 62. The inlet valve element 60 is mounted forwardly of the inlet valve seat 52. The inlet valve element 60 is normally contacting the valve seat 52 due to the biasing effect of the spring 59 operating against the inlet valve element guide 57. The inlet valve seat 52 is provided with rearwardly extending fingers 64 to operate as a guide about the outer periphery of the outlet valve element 61. The fingers permit passage of fluid radially outwardly from the intermediate portion of the sleeve 62. The outlet valve seat 65 is concentrically mounted within the diaphragm seat 50. A spring 66 is resiliently mounted between a radial wall on the rearward side of the inlet valve seat 52 and the radial wall on the forward side of the outlet valve seat 65. The spring 66 biases the outlet valve to a normally open position.

As the push rod moves forwardly, the block 46 moves a pin 70 forward thereby closing the outlet valve seat 65 with the valve 61.

Pin 70 extends through a stretching diaphragm 85 positioned within a diaphragm chamber forming a rearward part of power chamber 37. One or more passages are provided in the outlet valve seat 65 to connect the main portion of the power chamber with the diaphragm chamber. The thick outer periphery of diaphragm 85 is sealingly seated in the end of seat 50 and the thin central portion of the diaphragm receiving pin 70 is in sealing relation with that pin. The forward end of block 46 engages one side of the diaphragm and the rearward end of pin 70. The other side of the diaphragm is exposed to fluid in the diaphragm chamber. The forward end of pin 70 engages valve outlet seat 65.

Figure 2:
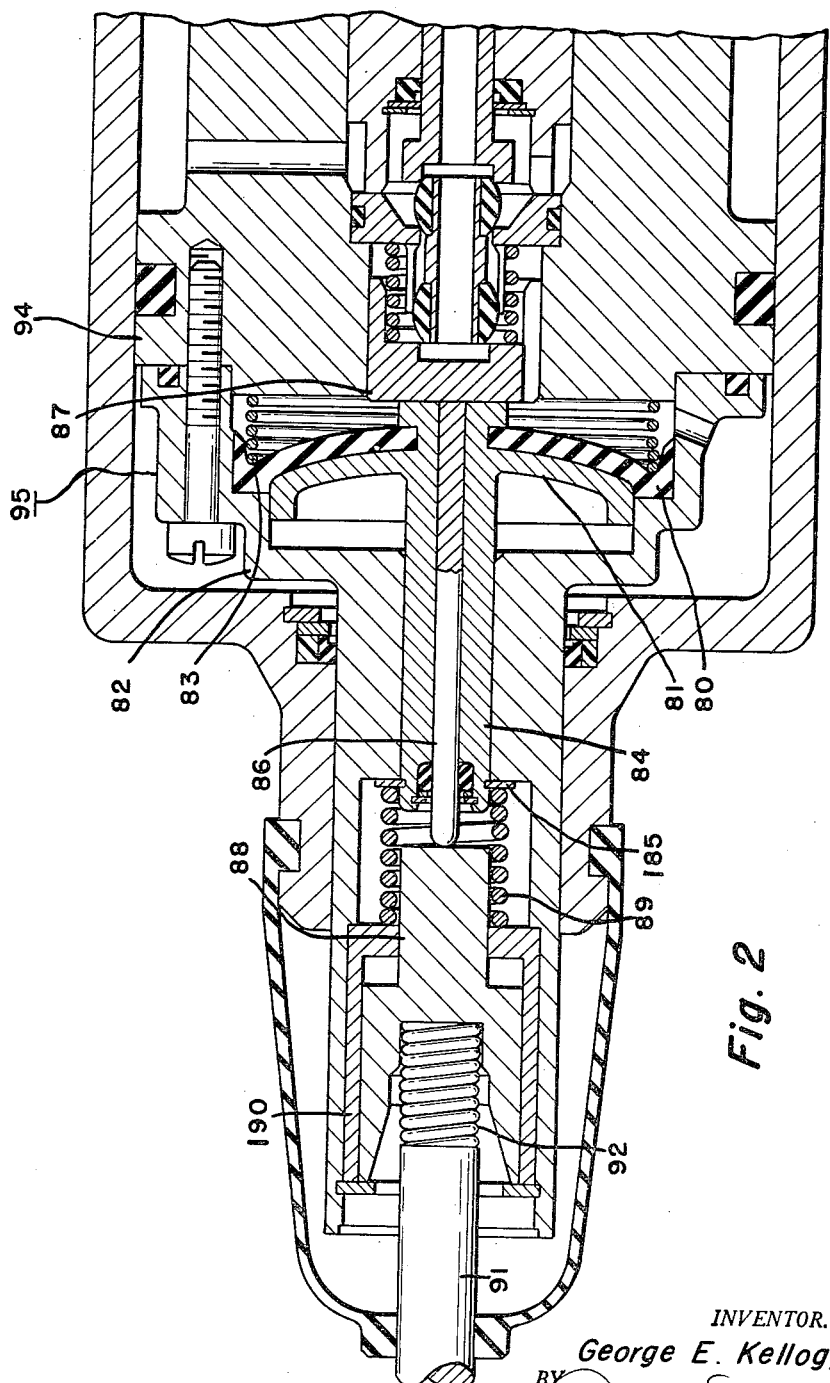
FIGURE 2 is a cross-section view of a modification of the diaphragm reaction means.

FIGURE 2 is a modification of FIG. 1 wherein the same general valve structure is employed but a different reaction system is used. The reaction system operates throughout diaphragm 80 which is mounted against the reaction plate 81. A rear section 82 of the power piston 95 forms a seat for the reaction plate 81 in its rearward position. The diaphragm 80 is sealed on its outer periphery by the inner periphery of the section 82 of the power piston. A spring 83 maintains a constant contact between the diaphragm 80 and a radial wall on the forward section 94 of the power piston 95. The power piston 95 is provided with a central opening for receiving the rearward portion 84 of the reaction plate 81. The rearward portion 84 is retained in its position by a snap ring 185. An operating stem 86 engages the outlet valve seat 87 on its forward end and the actuating block 88 on its rearward end. A spring 89 is positioned between the block guide 190 and the snap ring 185. The actuating block 88 receives the push rod 91 which is mounted in a spring 92 to permit slight angular movement of the manual control means.

This device operates in the following described manner. As a push rod 42 is moved forward by the brake lever 40, the actuating block 46 engages the rearward side of the diaphragm 85 on the forward end of the actuating block 46 which also engages the pin 70. The pin 70 contacts the outlet valve seat 65. The outlet valve element 61 is normally open due to the biasing effect of the spring 66. As the push rod 42 moves forward, the outlet valve seat 65 is accordingly moved forward to the point where the valve seat 65 contacts the outlet valve element 61. This closes the outlet passage 96 in the booster unit from the power chamber 37. Continued forward movement of the outlet valve seat 65 disengages the inlet valve element 60 from the valve seat 52. This permits passage of pressurized fluid from the chamber 90 into the power chamber 37. As the pressure builds up within the chamber 37, the power piston 31 moves forward. The forward movement of the power piston 31 also moves the master piston 26 forward thereby closing out the port 27. As the port 27 is closed, the fluid within the brake fluid system and chamber 28 is pressurized which accordingly operates the vehicle brakes.

During the process of building up of fluid pressure within the power chamber 37, the fluid also passes rearwardly causing a force against the forward wall of the diaphragm 85. The forward end of the actuating block 46 deforms the diaphragm 85 slightly as the actuating block moves forwardly. The deformation of the diaphragm 85 does not, however, prevent the sealing of the diaphragm on its inner and outer peripheries. As the fluid builds up within the power chamber 37 and along the forward surface of the diaphragm 85, the pressure transmits a force on the forward end of the actuating block 46. This, in turn, provides a reaction on the push rod 42 which is transmitted to the brake lever 40 to provide a "feel" to the operator. The pressure transmitted through the diaphragm to the actuating block and the manual control means is in direct proportion to the pressure actuating the hydraulic booster unit. With an increased force on the manual control means, an increased pressure is created within the power chamber 37 and the pressure within the chamber 28 of the master cylinder is correspondingly increased. In this manner, a proportional "feel" is provided to the operator of the vehicle brakes.

As the brake pedal is released, the spring 66 moves the outlet valve seat 65 rearwardly. The spring 59 moves the inlet valve element 60 rearwardly to the point where it contacts the valve seat 52. At this point, the booster unit is in the "hold" position.

A further release of the manual control means permits the exhaust valve seat 65 to move rearwardly thereby opening the valve seat 65 from the outlet valve element 61. The pressurized fluid within the power chamber 37 is then relieved and the pressurized fluid exhausts through the central passage 96 in the sleeve 62 and the central passage 97 in the inlet valve element guide 57. The port 98 permits continued passage of the exhaust fluid to the chamber 30 which is in communication with the port 16 through chamber 14. The brakes in this position are again in the retracted position.

While the embodiment of the present invention as herein disclosed constitutes a preferred form, it is to be understood that other forms might be adopted.

What is claimed is as follows:

1. In a device of the character described, comprising in combination; a power cylinder having passage means therein; a power piston operating within said power cylinder and adapted for operating means for pressurizing fluid within a hydraulic fluid brake actuating system, said power piston forming a power chamber within said power cylinder; a source of pressurized fluid; conduit means connecting said source of pressurized fluid with said power cylinder passage means; passage means in said power piston connecting said power cylinder passage means to said power chamber; inlet and an outlet valve means concentrically mounted within said power piston and within said connecting passage means and including an annular inlet valve seat, an annular inlet valve element biased to normally contact said inlet valve seat, an outlet valve element, and an outlet valve seat normally biased to an open position relative to said outlet valve element; a manual control means for operating said inlet and said outlet valve means; a diaphragm chamber; passage means connecting said diaphragm chamber with said power chamber; and a stretching diaphragm mounted within said diaphragm chamber and having sealing means formed by the outer periphery thereof in the rearward end of said diaphragm chamber and a relatively thin diaphragm center portion contacting the forward end of a manually operated means for transmitting reaction feel to said manual control means.

2. In a device of the character described, comprising in combination; a power cylinder having an inlet port, a source of pressurized fluid in communication with said inlet port, a power piston operating within said power cylinder and forming a power chamber with said power cylinder, said power piston adapted for pressurizing fluid within a hydraulic brake fluid actuating system, passage means in said power piston connecting said inlet port with said power chamber, valve means mounted concentrically within said power piston and within said connecting passage means and including a spherical inlet valve element and a spherical outlet valve element and a sleeve supporting said inlet and said outlet valve elements, an inlet valve seat, means for biasing said inlet valve element to a normally closed position with said inlet valve seat, an outlet valve seat, means for biasing said outlet valve seat to a normally open position relative to said outlet valve element, a diaphragm chamber, passage means connecting said diaphragm chamber with said power chamber, a diaphragm mounted within said diaphragm chamber forming the wall on the rearward side of said diaphragm chamber, manually operated means extending through said diaphragm for operating said valve means and contacting a limited portion of the rearward wall of said diaphragm, said diaphragm thereby transmitting a force from the pressurized fluid within said power chamber and said diaphragm chamber to said manually operated means.

3. In a device of the character described, comprising in combination, a power cylinder having an inlet port, a source of pressurized fluid in communication with said inlet port, a power piston operating within said power cylinder and forming a power chamber with said power cylinder, said power piston adapted for pressurizing fluid within a hydraulic brake fluid actuating system, passage means in said power piston connecting said inlet port with said power chamber, valve means mounted concentrically within said power piston and within said connecting passage means and including an inlet valve element having a curvilinear surface and an outlet valve element having a curvilinear surface and a concentric sleeve for mounting said inlet and said outlet valve elements, an inlet valve seat, means for biasing said inlet valve element to a normally closed position with said inlet valve seat, an outlet valve seat, means for biasing said outlet valve seat to a normally open position relative to said outlet valve element, a diaphragm chamber, passage means communicating with said diaphragm chamber and said power chamber, a diaphragm mounted within said diaphragm chamber and forming the rearward wall in said diaphragm chamber, a sealing portion on the outer periphery of said diaphragm, manually operated means extending into the rearward portion of said diaphragm, a pin engaging said manually operated means and said valve means for operating said valve means, and means for sealing the inner periphery of said diaphragm with said pin, said diaphragm thereby providing means for transferring a force from the pressurized fluid within said diaphragm chamber and said power chamber to said manually operated means by limited deformation of the center portion of said diaphragm when pressurized fluid is in said power chamber.

References Cited in the file of this patent

UNITED STATES PATENTS

| 2,735,268 | Stelzer | Feb. 21, 1956 |
| 2,745,383 | Hupp | May 15, 1956 |
| 2,761,427 | Shumaker | Sept. 4, 1956 |
| 2,883,970 | Stelzer | Apr. 28, 1959 |
| 2,883,971 | Ayers | Apr. 28, 1959 |